US011206696B2

United States Patent
Shiers et al.

(10) Patent No.: US 11,206,696 B2
(45) Date of Patent: Dec. 21, 2021

(54) UNIDIRECTIONAL FIELD DEVICE DATA TRANSFER

(71) Applicant: Rosemount Inc., Shakopee, MN (US)

(72) Inventors: Bret J. Shiers, Shakopee, MN (US); Jared E. Sweet, Eden Prairie, MN (US); Ross C. Lamothe, Eden Prairie, MN (US)

(73) Assignee: Rosemount Inc., Shakopee, MN (US)

(*) Notice: Subject to any disclaimer, the term of this patent is extended or adjusted under 35 U.S.C. 154(b) by 174 days.

(21) Appl. No.: 16/576,126

(22) Filed: Sep. 19, 2019

(65) Prior Publication Data
US 2021/0092780 A1 Mar. 25, 2021

(51) Int. Cl.
*G06K 19/06* (2006.01)
*H04W 76/10* (2018.01)
*H04Q 9/00* (2006.01)
*H04W 12/06* (2021.01)

(52) U.S. Cl.
CPC ...... *H04W 76/10* (2018.02); *G06K 19/06028* (2013.01); *G06K 19/06037* (2013.01); *H04Q 9/00* (2013.01); *H04W 12/06* (2013.01); *H04Q 2209/50* (2013.01)

(58) Field of Classification Search
None
See application file for complete search history.

(56) References Cited

U.S. PATENT DOCUMENTS

| 6,370,448 | B1 | 4/2002 | Eryurek | |
|---|---|---|---|---|
| 7,852,271 | B2 | 12/2010 | Grunig et al. | |
| 2017/0033925 | A1* | 2/2017 | DeNeut | H04L 9/0819 |
| 2018/0110135 | A1* | 4/2018 | Sum | H05K 5/0247 |
| 2019/0042819 | A1* | 2/2019 | Agarwal | G05B 19/41835 |
| 2019/0103914 | A1 | 4/2019 | Junk et al. | |

FOREIGN PATENT DOCUMENTS

| DE | 102004063777 A1 * | 9/2005 | G09G 3/00 |
|---|---|---|---|
| EP | 1202145 A1 | 5/2002 | |
| JP | 2006-054591 A | 2/2006 | |
| WO | 2014158510 A1 | 10/2014 | |

OTHER PUBLICATIONS

International Search Report and Written Opinion for International Patent Application No. PCT/US2020/049879, dated Dec. 15, 2020, 11 pages.

* cited by examiner

*Primary Examiner* — Kristy A Haupt
(74) *Attorney, Agent, or Firm* — Christopher R. Christenson; Kely, Holt & Christenson PLLC

(57) ABSTRACT

A field device includes a process communication module, a graphical display and a controller. The process communication module is configured to communicate in accordance with a process industry standard communication protocol. The controller is operably coupled to the process communication module and the graphical display and is configured to responsively cause the graphical display to generate a machine-readable display output.

15 Claims, 5 Drawing Sheets

UNIDIRECTIONAL FIELD DEVICE DATA TRANSFER

BACKGROUND

Field devices such as process variable transmitters are used in the process control industry to remotely sense a process variable. Field devices such as actuators are used by the process control industry to remotely control physical parameters of a process, such as flow rate, temperature, et cetera. The process variable may be transmitted to a control room from a field device such as a process variable transmitter for providing information about the process to a controller (e.g. in the control room). The controller may then transmit control information to a field device such as an actuator to modify a parameter of the process. For example, information related to a pressure of a process fluid may be transmitted to a control room and used to control a process such as oil refining.

Usually field devices have field-hardened enclosures so that they can be installed outdoors in relatively rugged environments and be able to withstand climatological extremes of temperature, humidity, vibration, mechanical shock, et cetera. These devices can also typically operate on relatively low power. For example, field devices are currently available that receive all of their operating power from a known 4-20 mA loop.

Field devices such as process variable transmitters are used to monitor process variables associated with fluids such as slurries, liquids, vapors and gases in chemical, pulp, petroleum, gas, pharmaceutical, food, and other fluid processing plants. Process variables include, without limitation, vibration, viscosity, velocity, volume, mass, energy, pressure, temperature, flow, level, pH, conductivity, turbidity, density, concentration, chemical composition and other fluid properties. Field devices such as process actuators include control valves, pumps, heaters, agitators, coolers, solenoids, vents and other fluid controlling devices.

Some field devices communicate in accordance with a wired process communication protocol. For example, some field devices employ digital circuitry which communicates with a controller using a digital signal which is superimposed onto an analog current signal flowing through a process control current loop. One example of such a technique is the Highway Addressable Remote Transducer (HART®) communication protocol. The HART® protocol and other such protocols typically include a set of commands or instructions which can be sent to the field device to elicit a desired response, such as device control or interrogation.

Another process communication protocol is known as the FOUNDATION™ Fieldbus protocol. This protocol is directed to defining a communication layer or protocol for transmitting information on a process control loop. The Fieldbus protocol specification is ISA-S50.01-1992 promulgated by the Instruments Society of America in 1992. Another known wired process communication protocol is known as Profibus. Yet another known wired process communication protocol is known as Modbus. Additional wired process communication protocols are also known.

More recently, wireless technologies are being used to communicate with field devices. Wireless operation simplifies field device wiring and setup. One particular form of wireless process communication is set forth in IEC62591 (WirelessHART). However, it is also becoming desirable to provide field devices with additional wireless communication capabilities, such as communication in accordance with known WiFi, Bluetooth, and/or infrared (IrDA) protocols.

The environment in which a field device operates can include highly volatile or even explosive gases. Accordingly, significant requirements are demanded of such field devices to ensure that they cannot inadvertently generate a source of ignition for such environments. One way in which this safety is assured is by placing the circuitry of the field device with an explosion-proof housing. One example of an explosion-proof specification is set forth in, "Approval Standard for Explosion-Proof Electrical Equipment General Requirements, Class Number 3615, promulgated by Factory Mutual Research March 1989." Compliance with an explosion-proof specification, such as that set forth above, helps ensure that even if circuitry within the field device becomes too hot or generates a spark, that ignition occurring within the field device's housing cannot escape into the larger volatile process environment. Another way in which safety of the process environment is assured is by compliance of the electronic circuitry itself with intrinsic safety requirements. One example of an intrinsic safety specification is set forth in "Approval Standard Intrinsically Safe Apparatus and Associated Apparatus for Use in Class I, II and III, Division 1 Hazardous (Classified) Locations, Class Number 3610, promulgated by Factory Mutual Research, October 1988." Providing a field device that operates in accordance with an explosion-proof specification and/or an intrinsic safety specification helps ensure the safety of the process environment as well as the safety for those who interact with such field devices.

Safety is such a concern in the process environment that in the event that technician needs to interact with components within a field device (such as to attach test leads to configure the field device or diagnose it), the act of opening the enclosure (i.e., removing the cover) may require a specific authorization (such as a hot work permit) to be obtained before such work can occur. In some instances, process control operations in the process control environment may need to be shut down prior to performing work on the field device to prevent potential electric sparks from causing an explosion in a hazardous gas atmosphere.

SUMMARY

A field device includes a process communication module, a graphical display and a controller. The process communication module is configured to communicate in accordance with a process industry standard communication protocol. The controller is operably coupled to the process communication module and the graphical display and is configured to responsively cause the graphical display to generate a machine-readable display output.

DETAILED DESCRIPTION OF ILLUSTRATIVE EMBODIMENTS

Figure 1:
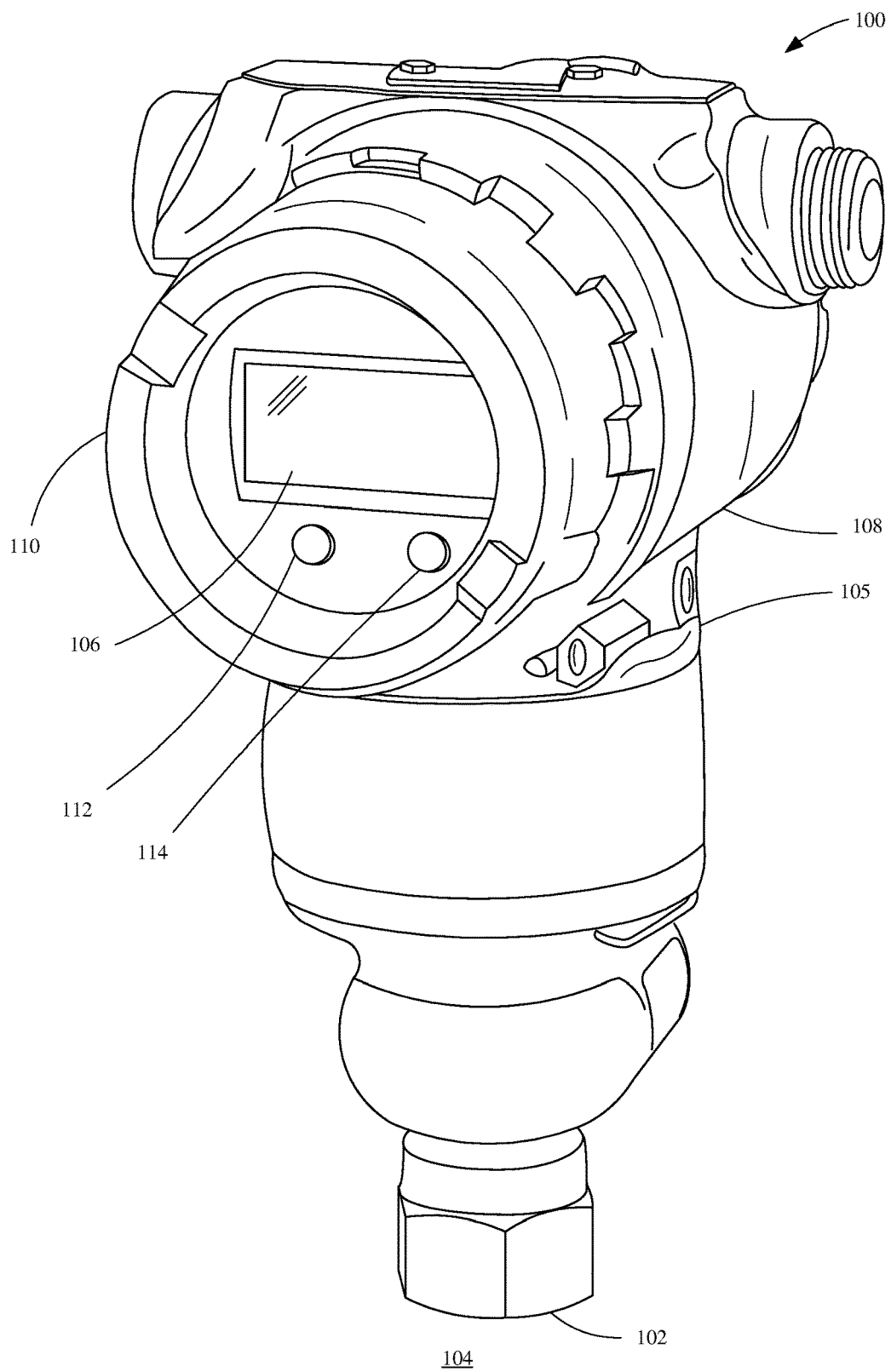
FIG. 1 is a diagrammatic perspective view of a field device with which embodiments of the present invention are particularly applicable.

Embodiments of the present invention generally simplify and expedite a user or technician's interaction with a field device operating in the field. When a technician is required to open the field device's housing, the process itself is relatively cumbersome and slow. In some instances, the technician may need to obtain a hot work permit. Then, the technician must open the field device's housing, attach leads, download information via a digital protocol, and then replace the cover. Even excluding the time required to obtain the hot work permit, this entire process may require many minutes. More recently it has become useful to interact with field devices that have wireless communication abilities in order to avoid the necessity for removing the cover and potential acquisition of a hot work permit. For example, US Patent Application Publication No. 2019/0103914 contemplates utilization of Bluetooth Low Energy (BLE) communication with a field device (shown as a valve controller). While wireless communication with field devices generally avoids the necessity of removing the cover, wireless communication itself can present other challenges. For example, some users may be sensitive to security concerns with such wireless communication.

Another difficulty with current field device interaction is that the field devices are generally relatively low-power devices and employ relatively small digital displays. For example, some current field devices employ liquid crystal displays that have a relatively low resolution and are of such size that they can only display a dozen or so human-readable words and numbers on the screen at any one time. This makes it difficult to provide a user or technician with all the information they may be looking for in a concise manner. Accordingly, current devices are somewhat limited in their ability to provide significant amounts of digital data to a user or technician at a field device in the field while still ensuring process safety and security.

Embodiments described herein generally leverage a machine-readable display output on a field device in combination with a technician or user's camera such as on a mobile device in order to quickly and securely transfer significant amounts of digital data from an operating field device to the technician's mobile device. Thus, instead of providing a dozen or so human-readable words or numbers, the device may show a machine-readable image (e.g., QR code, barcode, or another suitable image) that is acquired by the user or technician's device.

The prevalence of smart devices in process installations is increasing. These smart devices are typically equipped with a high-resolution camera capable of capturing machine-readable encoded images. Processing of these encoded images allows for faster data transfer than when using a wired connection. It is believed that time savings can be achieved due to the fact that the transfer can occur without needing to remove any of the field device's covers. This data transfer is also one-way, point-to-point. This alleviates some of the security concerns associated with current wireless options. Display of the encoded image, in one embodiment, on the field device is initiated by a local button press or other suitable techniques.

FIG. 1 is a diagrammatic perspective view of a field device with which embodiments of the present invention are particularly applicable. Field device 100 is illustrated as a process fluid pressure transmitter having a process fluid inlet 102 that is configured to couple to a process 104. A process fluid pressure sensor is disposed within sensor body 105 and provides an electrical signal related to the process fluid pressure. This electrical signal is operated upon by a controller, such as a microprocessor, and converted to a process fluid pressure that may be displayed by display 106 and/or communicated to a remote device, such as a control room. Display 106 is typically a graphical display in that it has a number of elements (dots or pixels) that can be engaged to generate a display output, generally in the form of letters, numbers, or icons. Process fluid pressure transmitter has a robust enclosure 108 with at least one cover 110 that is removable in order to access the interior of field device 100. Additionally, field device 100 may include one or more local user interface elements, such as buttons 112, 114 that allow a user to interact with the field device. Note, field device 100 is simply one example of myriad different field devices with which embodiments described herein can be practiced.

Figure 2:
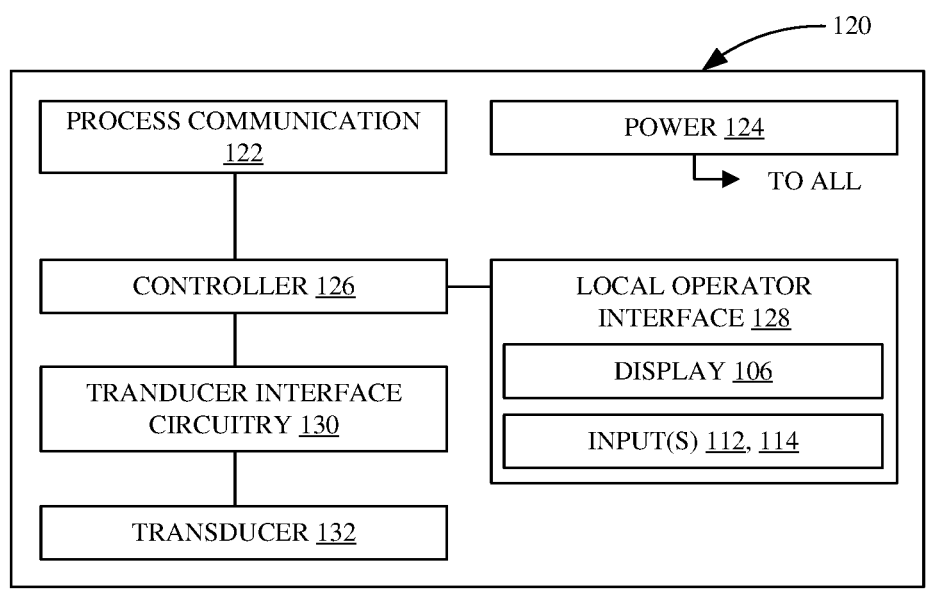
FIG. 2 is a block diagram of a field device with which embodiments of the present invention can be practiced.

FIG. 2 is a block diagram of a field device with which embodiments of the present invention can be practiced. Circuitry 120 is disposed within enclosure 108 and includes loop communication module 122, power module 124, controller 126, local operator interface 128, transducer interface circuitry 130, and transducer 132.

Process communication circuitry 122 is configured to communicate in accordance with a process industry communication protocol, such as the HART® protocol, FOUNDATION™ Fieldbus, or Wireless HART (IEC62591) protocol. Process communication allows field device 100 to report a process variable or receive a process command over a process communication loop. Process communication circuitry 122 is coupled to controller 126 to allow controller 126 to interact with a process controller and/or other field devices over a process communication loop or segment.

Controller 126 is any suitable device that is able to execute programmatic steps in order to provide its field device functions. In one example, controller 126 includes a microprocessor and associated memory and timing circuitry that executes programmatic steps to provide a field device output or to receive a field device command and generate a process actuator output. Controller 126 is coupled to local operator interface circuitry 128.

Examples of local operator interface circuitry 128 include display 106, and inputs 112, 114. Display 106 can include any suitable display technology including, without limitation, a light emitting diode display (such as an OLED display or an AMOLED display), an electro luminescent display (ELD), a liquid crystal display (LCD), a plasma display, a quantum dot (QLED display), a vacuum fluorescent display, an e-ink display, or any suitable technology capable of rendering a machine-readable image. While inputs 112, 114 are shown as buttons, any suitable input element can be used in accordance with embodiments described herein. For example, such elements may include magnetic switches, hall switches, reed switches, capacitive touch screens, resistive touch screens, rotary encoders, photosensitive sensors, such as a photosensitive diode, acoustic sensors, or any other suitable elements capable of sensing user interaction and providing a signal indicative of such interaction to controller 126.

Transducer interface circuitry 130 allows controller 126 to interact with transducer 132. In an embodiment where the field device is a process variable transmitter, transducer interface circuitry 130 includes an analog-to-digital converter that is coupled to a transducer 132 in the form of a process variable sensor, such as a temperature or pressure sensor. In embodiments where the field device is a process actuator, transducer interface circuitry 130 may include suitable current driving circuitry to engage a transducer, such as a transducer such as a motor or valve positioner to generate valve movement.

Figure 3:
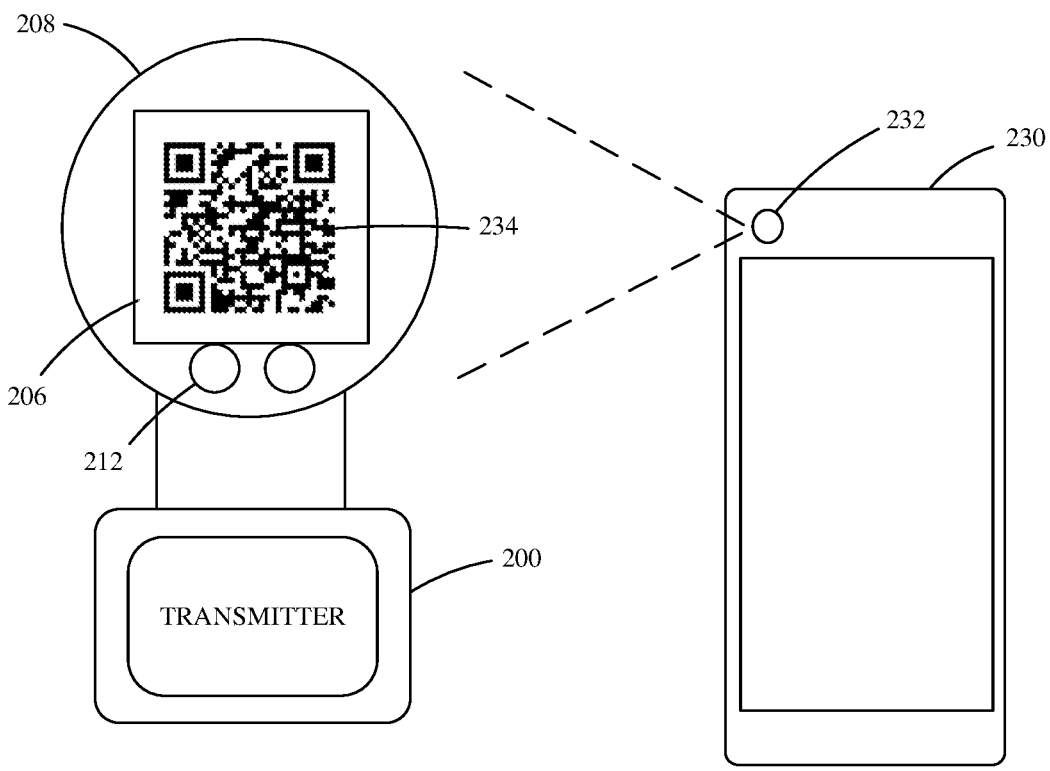
FIG. 3 is a diagrammatic view of unidirectional data transfer from a field device in accordance with an embodiment of the present invention.

FIG. 3 is a diagrammatic view of unidirectional data transfer from a field device in accordance with an embodiment of the present invention. In the illustrated example, field device 200 is a process variable transmitter having a display 206 and buttons 212, 214. In one embodiment, display 206 is disposed within housing/enclosure 208, which can be explosionproof. Display 206 is viewable through a window in housing 208 such that display 206 can be viewed without opening housing 208.

As can be seen in FIG. 3, a user or technician's smartphone 230 is brought into proximity of field device 200 such that camera 232 of smartphone 230 can acquire an image of a machine-readable display output 234 that is presented on display 206. In the illustrated example, machine-readable display output 234 is a two-dimensional barcode, such as a QR code. However, any suitable machine-readable image can be used. In one embodiment, process variable transmitter 200 is caused to generate machine-readable image 234 by the technician interacting with one or both of buttons 212, 214. However, in another example, the process variable transmitter may be caused to generate machine-readable display output 234 upon receipt of a suitable command via process communication.

In another embodiment, where field device 200 includes a photosensitive diode, the field device can detect a flash of light emanating from the user's smartphone to essentially detect a flash signal as a trigger for displaying machine-readable image 234. Many smart devices that have a camera are also equipped with a light source capable of providing a flash for taking pictures. This flash can be used to cause the field device to display machine-readable image 234. Further, a flash signal can also be used to signal to the field device that the user's smart device is finished reading machine-readable image 234 and that field device 200 may display a next machine-readable image in a sequence of machine-readable images. In this way, many images could be processed by the user's smart device with no user action required to advance or otherwise control image display.

In yet another example, process variable transmitter 200 may be caused to generate machine-readable image 234 upon occurrence of an event, such as a high limit violation or a measured limit going outside of bounds, or a failure of a component within process variable transmitter 200. For example, in embodiments that use e-ink displays (which generally do not need electrical power to maintain their display state) upon occurrence of a failure of process variable transmitter 200, a diagnostic or troubleshooting image can be generated on display 206 and the display can be maintained thereon even in the event of complete power loss within the process variable transmitter.

Figure 4A:
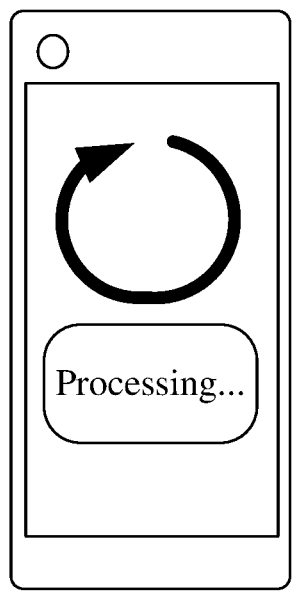
FIGS. 4A and 4B illustrate a user's mobile device processing a machine-readable image obtained from a field device in accordance with an embodiment of the present invention.
Figure 4B:
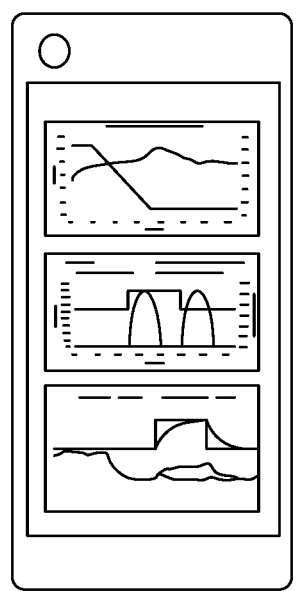

When the user or technician's device acquires one or more images of machine-readable display output 234, the smart device may automatically, or at the command of the user, process the machine-readable image(s) in order to extract data therefrom. As shown in FIG. 4A, an application executing on the technician's device 230 may provide an indication of such processing. Upon completion of the processing, the extracted data may be then shown to the technician, such as shown in the various graphs presented to the user in FIG. 4B. Note, a single machine-readable image may be processed to provide information on the user's device or a plurality of machine-readable images may be obtained from the field device in a sequence and processed to provide the information on the user's device.

It is believed that embodiments of the present invention will generally improve interaction with field devices in a number of different scenarios.

In a first scenario, a machine-readable display may be used to provide detailed information about the individual field device. For example, this information could include, without limitation, the field device's order code or options, thereby allowing the user to easily re-order the exact same field device or spare parts. This information could also include the state of all configuration parameters in the field device. Using machine-readable codes like this could be an alternative to existing RFID tagging technology.

In another scenario, the machine-readable information may be useful to provide an indication about the type of device. This could be helpful URLs or links to product documentation for the specific model of the field device, saving the user or technician time in looking up the information on their own.

In yet another example, the machine-readable image could provide process data history, diagnostic logs, or other large chunks of data relatively quickly. The local display is not an ideal way to show very long strings or graphs, such as can be shown in large format displays. Instead, an encoded image can be displayed that contains a history of the field device's process values and/or diagnostic/calibration logs in a specific format, which could be captured and processed by a user or technician's smart device. Finally, such data could be provided in a user-friendly manner such as a graph or table shown in FIG. 4B.

The above examples are merely illustrative of the improved information transfer between a field device and a user or technician's smart device via relatively limited display real estate on the field device. The encoded images described herein can take many forms. Common examples include two-dimensional barcodes or standard barcodes. These images could be shown as the only item on the screen or could be shown in addition to some human-readable text.

Additionally, embodiments described herein can be leveraged to facilitate improved security for bidirectional wireless communication between a user's device and a field device. For example, the data extracted from the machine-readable image could be required by the field device as part of a wireless communicate handshake protocol or authentication. In one example, the data encoded in the image could be a password or key that a user needs to capture with their smart device to authenticate their smart device to connect via another wireless protocol, such as WiFi or Bluetooth. Accordingly, if there is a situation where a user is concerned about security and being proximate to the field device provides sufficient security to confirm authenticity, then using an encoded image as a form of two-factor authentication would allay security concerns.

Figure 5:
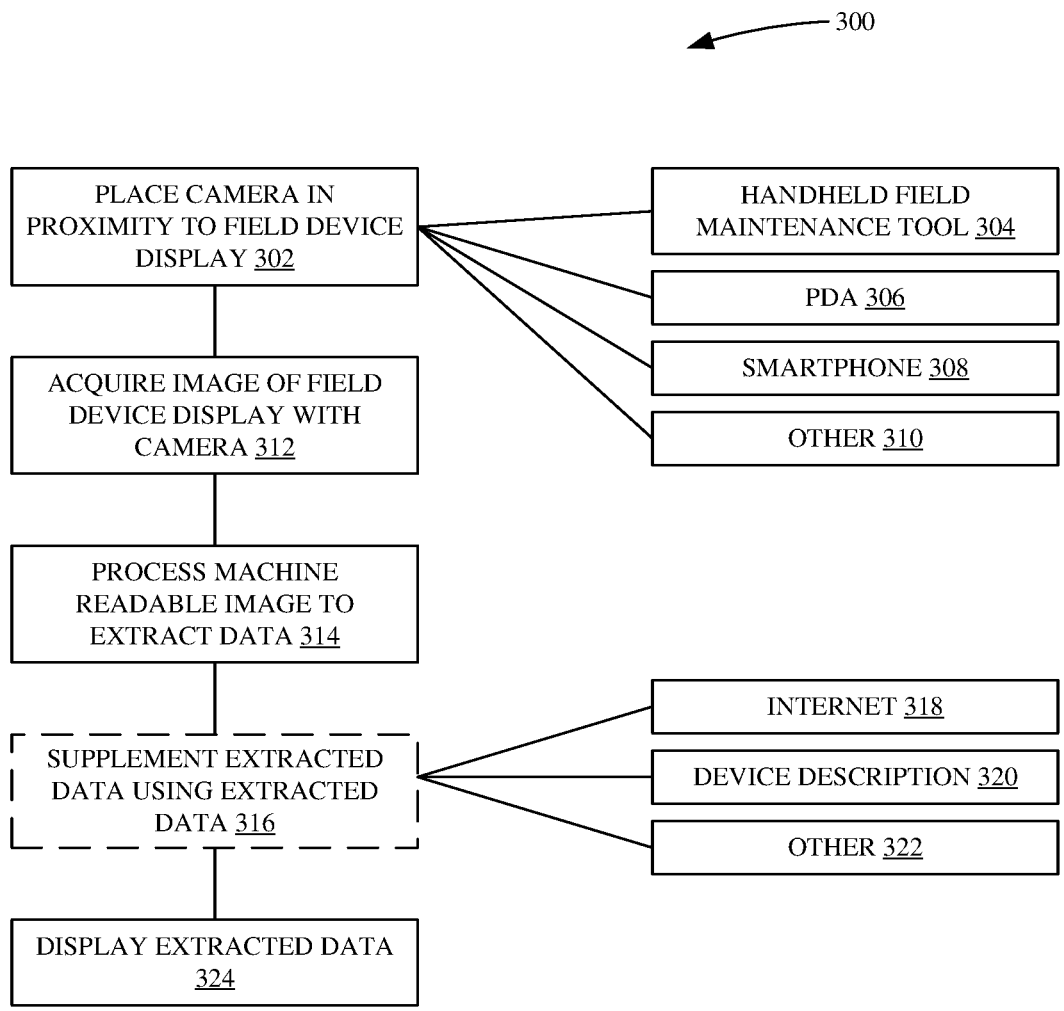
FIG. 5 is a flow diagram of a method of transferring data from a field device in accordance with an embodiment of the present invention.

FIG. 5 is a flow diagram of a method of transferring data from a field device in accordance with an embodiment of the present invention. Method 300 begins at block 302 where a user or technician places a smart device having a camera into proximity of a field device display. Examples of such smart devices include a handheld field maintenance tool 304. However, the technician's device may be a personal digital assistant, such as that indicated at block 306, a smartphone 308, or any other suitable smart device having a camera that is able to acquire an image of the display, such as indicated at block 310. Once the camera is in proximity of the display of the field device, the field device caused to generate a machine-readable image on its display and the user's smart device acquires an image of the field device's display, as indicated at block 312.

Once the image has been acquired, it is processed, at block 314, in accordance with suitable known image processing techniques in order to extract the encoded data from the machine-readable image. Next, at optional block 316, the extracted information may be supplemented using the extract information itself. For example, such supplementation can include the user or technician's device using an extracted URL to obtain information from the internet, 318. In another example, extracted information about the field device can be used to reference a device description (DD) of the field device, as indicated at block 320.

Additionally, any other suitable source of information can be used to supplement the information based on the extracted information as indicated at block 322. Finally, at block 324 the extracted data as well as any suitable supplementation data is displayed to the user on the user's smart device. An example of such display is shown above with respect to FIG. 4B.

Figure 6:
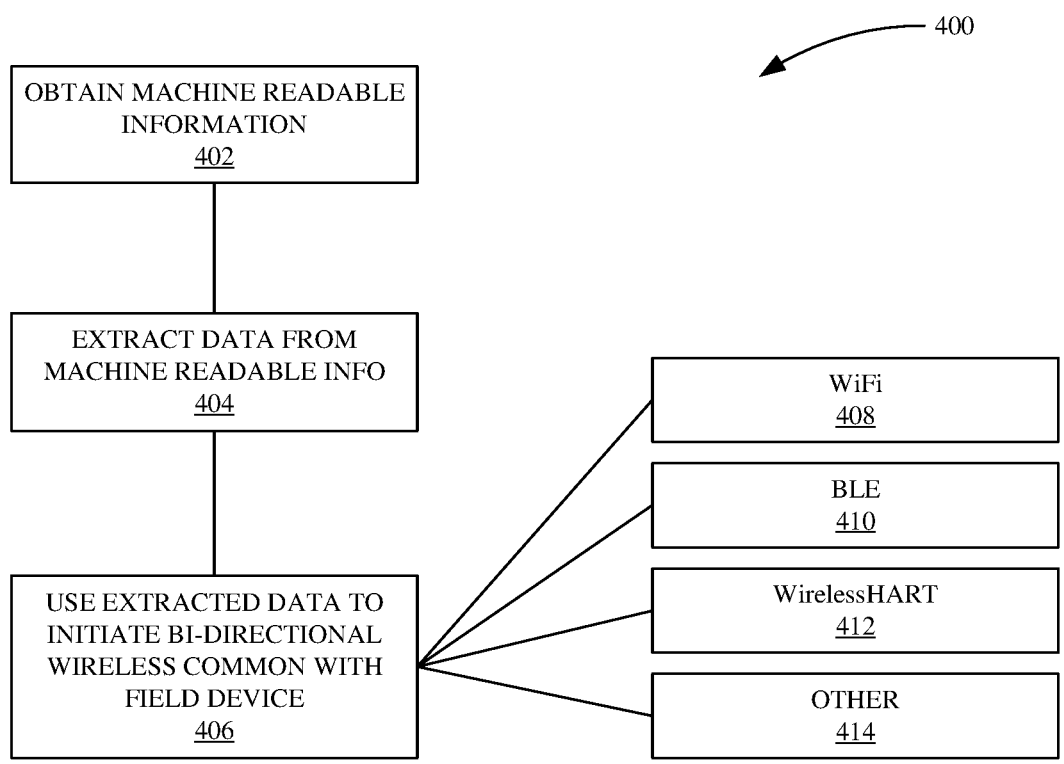
FIG. 6 is a flow diagram of a method of establishing bi-directional wireless communication with a wireless field device in accordance with an embodiment of the present invention.

FIG. 6 is a flow diagram of a method of establishing bidirectional wireless communication with a wireless field device in accordance with an embodiment of the present invention. Method 400 begins at block 402 where a field device provides a machine-readable image on its display and a user or technician's smart device acquires an image thereof. The machine-readable image can be that in accordance with any of the examples set forth above. Next, at block 404, the user or technician's smart device extracts data from the machine-readable image in accordance with a suitable data extraction technique for the particular machine-readable image technology used. Next, at block 406, the extracted data is used to initiate bidirectional wireless communication with the field device. Any suitable bidirectional wireless communication protocol can be used. Examples include wireless fidelity (WiFi) 408, Bluetooth, such as Bluetooth Low Energy 410, WirelessHART 412, or any other suitable wireless communication technology now known or later developed, as indicated at block 414.

An example of using the extracted information to establish bidirectional wireless communication includes extracting a password such as a one-time password generated by the field device and encoded in the machine-readable image. Then, upon successful extraction of the password from the machine-readable image, the user is able to enter the extracted password back to the field device via the wireless communication initiation process, such as Bluetooth pairing. This authentication factor can be used in addition to a one-factor authentication (such as username and password) to ensure that the user or technician is physically proximate the field device. This can provide added wireless information security which may further facilitate the ability to use bidirectional wireless communication in many instances.

Although the present invention has been described with reference to preferred embodiments, workers skilled in the art will recognize that changes may be made in form and detail without departing from the spirit and scope of the invention.

What is claimed is:

1. A field device comprising:
    a process communication module configured to communicate in accordance with a process industry standard communication protocol;
    a graphical display; and
    a controller operably coupled to process communication module and the graphical display, the controller being configured to responsively cause the graphical display to generate a series of machine-readable display outputs; and
    a photosensitive sensor coupled to the controller and wherein the controller is configured to cause the graphical display to step through the series of machine-readable display outputs based on signals from the photosensitive sensor.

2. The field device of claim 1, and further comprising an enclosure containing the graphical display and the controller.

3. The field device of claim 2, wherein the enclosure is configured to comply with art explosion-proof specification.

4. The field device of claim 1, wherein the controller is configured to responsively cause the graphical display to generate the machine-readable display output upon receiving a button press.

5. The field device of claim 1, wherein the controller is configured to responsively cause the graphical display to generate the machine-readable display output upon receiving a command via process communication.

6. The field device of claim 1, wherein the controller is configured to responsively cause the graphical display to generate the machine-readable display output upon occurrence of a device fault.

7. The field device of claim 6, wherein the machine-readable display output is indicative of the device fault.

8. The field device of claim 1, wherein the graphical display output includes a plurality of pixels.

9. The field device of claim 1, wherein the graphical display is a liquid crystal display.

10. The field device of claim 1, wherein the display is an e-ink display.

11. The field device of claim 1, wherein the machine-readable display output is a bar code.

12. The field device of claim 11, wherein the bar code is a two-dimensional bar code.

13. The field device of claim 1, wherein circuitry of the field device is configured to comply with an intrinsic safety specification.

14. The field device of claim 1, wherein the field device is a process variable transmitter.

15. The field device of claim 1, wherein the field device is a process actuator.

* * * * *